United States Patent Office 3,464,434
Patented Sept. 2, 1969

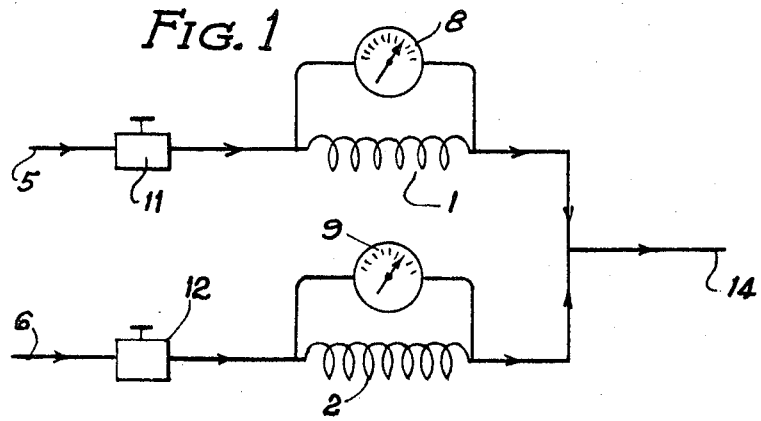
Fig. 1
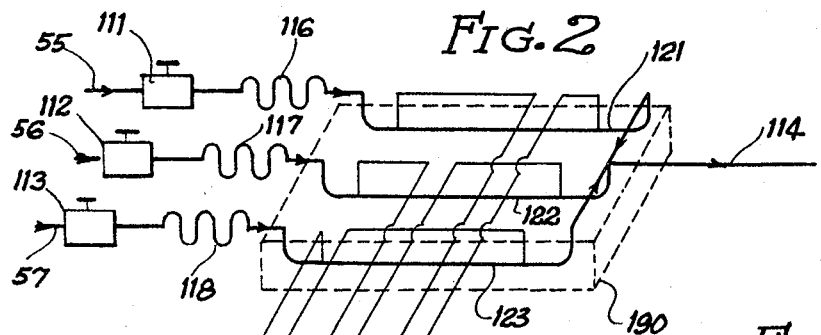
Fig. 2
Fig. 3
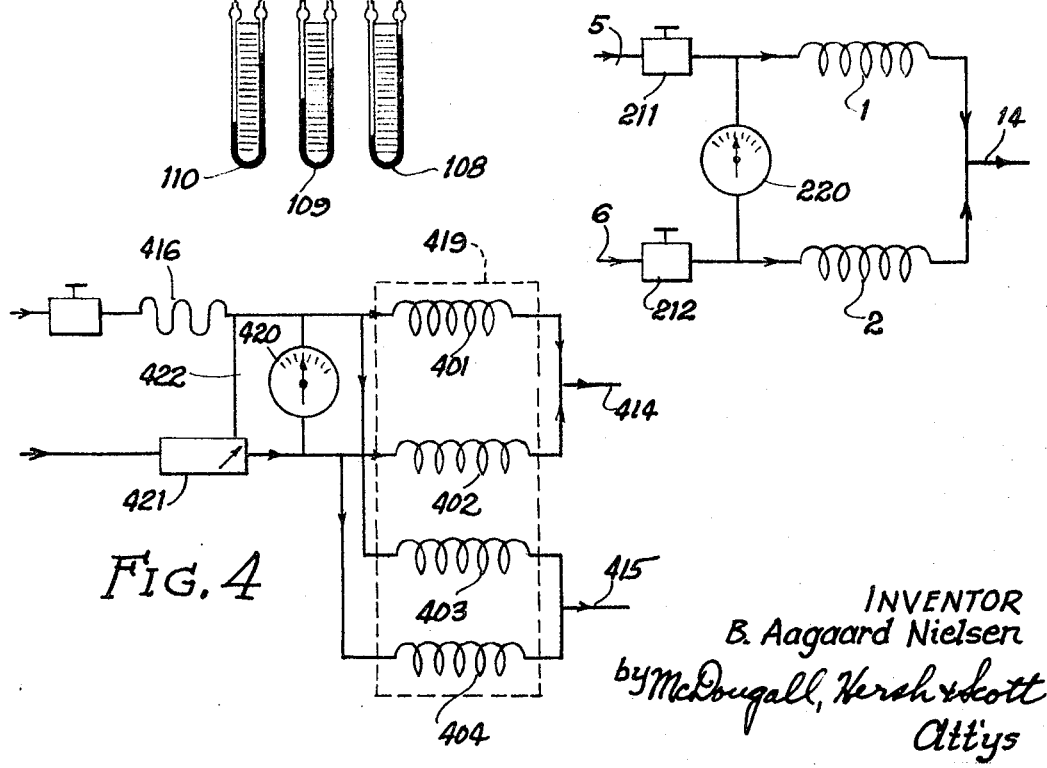
Fig. 4
INVENTOR
B. Aagaard Nielsen
by McDougall, Hersh & Scott
Att'ys

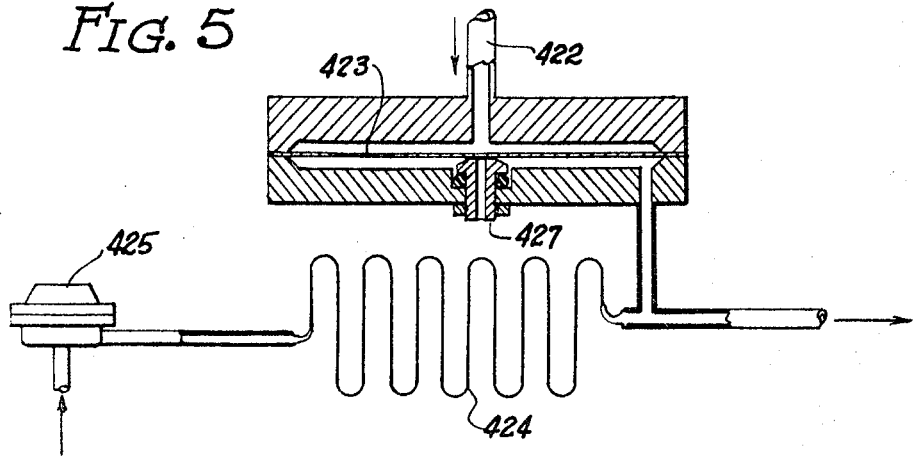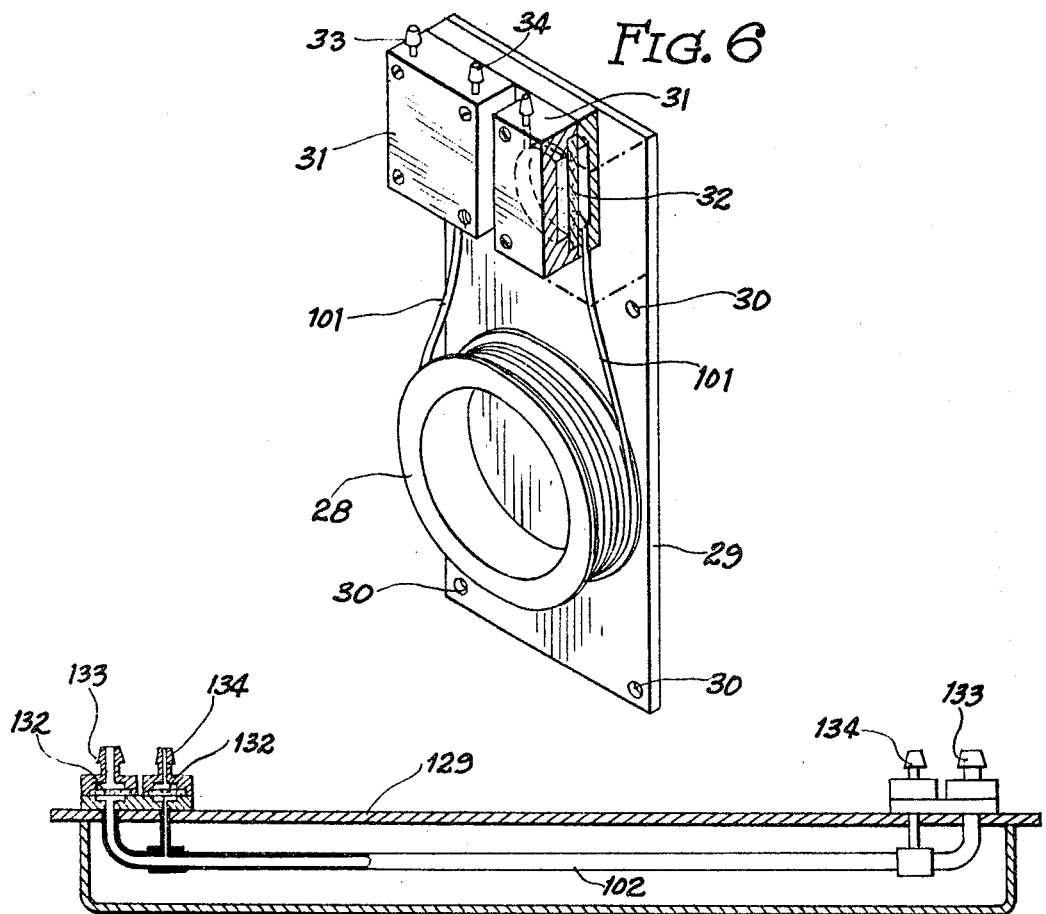

3,464,434
GAS-MIXING APPARATUS
B. Aagaard Nielsen, Hellerup, Denmark, assignor to
Radiometer A/S, Copenhagen NV., Denmark
Filed Dec. 30, 1965, Ser. No. 517,566
Int. Cl. G05d 11/03; F16k 40/00, 11/02
U.S. Cl. 137—98                                9 Claims

ABSTRACT OF THE DISCLOSURE

Apparatus and method for the continuous mixing of at least two gases including resistance tubes through which the gases pass before mixing in a common outlet. In one form, means are provided for measuring the pressure drop across the resistance tubes and the mixing ratio is controlled by adjusting pressures regulators. In another form, differential pressure regulator means are connected across lines feeding to the resistance tubes for eliminating pressure differences between the input ends of the resistance tubes whereby a gas mixture of fixed composition is obtained in the common outlet tube. More sets of resistance tubes, each set having a common outlet tube, can be connected to the regulated feed lines to obtain additional mixtures having other fixed compositions.

---

The invention relates to systems providing for the continuous mixing of two or more gases in known, fixed, or adjustable proportions. When speaking of gases hereinafter, it will be understood that one or more of the gases to be mixed may be mixtures themselves, e.g. atmospheric air.

Structures designed in accordance with the invention are particularly advantageous in the production of gas mixtures in small quantities, e.g., at flow rates of less than five to 10 ml./sec. Such mixtures are used, e.g., for adjustment of measuring instruments for partial pressure or volume percentages, or for equilibration of liquids, e.g. biological liquids, with gases of known partial pressure. The structures of the invention also have advantages over known systems used for production of gas mixtures in larger quantities, e.g. for physiological examinations or measurements, and it is, therefore, not the purpose to restrict the patent only to the first mentioned apparatus for small flow rates.

Various known methods exist for mixing of gases. One of them works with a piston pump for each type of gas. The composition of the mixture is determined by the stroke volume of the pumps and the number of strokes per minute. These structures require a large mixing chamber for the gases if they are to deliver a gas with constant composition. Furthermore, they have the disadvantage that they contain moving mechanical parts which are subject to wear which, particularly at small stroke volumes, will influence the accuracy.

Another known method for producing gas mixtures consists in dosing of each individual component of the gas mixture by feeding the individual component through an orifice in a plate or through a short nozzle under the influence of pressure difference. The gas flow through such an orifice or nozzle will at a first approximation be proportional to the area of the orifice and the square root of the proportion between the pressure difference and the specific gravity of the gas. This method is not suited for producing gas mixtures in small quantities because the smallest orifices which can be produced in practice and the smallest pressure differences which can be controlled and measured will give rather large gas volumes. Apparatus working according to this method are furthermore best suited for producing gas mixtures with one particular composition and in one particular quantity, i.e. by one specific pressure difference over the orifices. This is the case because the non-linear and not exactly known relationship between rate of flow and pressure difference makes it difficult to vary the composition of the mixture as well as the total flow rate in a predictable way by varying the pressure differences.

It is the general object of this invention to provide systems for the continuous production of gas mixtures which do not suffer on the drawbacks indicated above related to known methods.

It is a more particular object of this invention to provide a gas mixing apparatus which does not need a mixing chamber and does not contain any moving mechanical parts subject to wear in the elements determining the composition of the mixture.

It is a further object of the invention to provide an apparatus of the type described which permits the production of gas mixtures in small quantities so that waste of gas can be avoided when there is no need for larger quantities, and which is adapted to produce gas mixtures with adjustable known compositions of the mixture, or to produce gas mixtures with one or more known mixtures independently of the total flow rate.

These and other objects of this invention will appear hereinafter and for purposes of illustration, but not of limitation, specific embodiments of the invention are shown in the accompanying drawings in which:

FIGURE 1 is a schematic illustration of one system characterized by the features of this invention;

FIGURE 2 is a schematic illustration of a modified system characterized by the features of this invention;

FIGURE 3 is a schematic illustration demonstrating a system particularly designed for the mixing of gases in a fixed known proportion;

FIGURE 4 is a schematic illustration of a system designed for the simultaneous production of two gases in two fixed and known ratios;

FIGURE 5 is an illustration in cross section of a differential pressure regulator adapted to be used in a system of this invention;

FIGURE 6 is a perspective illustration of a resistance tube of a type suitable for use in the system of this invention; and, FIGURE 7 is a sectional view of an alternative form of a resistance tube adapted to be employed in a system of this invention.

The system of this invention is characterized by means which produce a flow rate for each individual gas which is determined by the pressure drop along a tube. The tube is dimensioned so that the volumetric flow rate is proportional to the pressure drop, and this is accomplished with a high degree of accuracy. After being dosed as indicated, the gases are brought together and mixed in a common outlet tube.

To provide the desired proportionality, the diameter of the tube must be so large that the velocity of the gas at the required maximal flow rate is so low that the flow is non-turbulent. In addition, the tube must be long enough so that the pressure drop produced by the viscosity of the gas and which is proportional to the first power of the flow rate is much larger than the dynamic pressure drops produced by the changes in velocity of the gas at the input and output ends of the tube and which are proportional to the second power of the flow rate. The radius of curvature of the tube should also be of sufficient magnitude so as not to disturb the described flow. Tubes of this type, which are so dimensioned that the pressure drop is proportional to the flow rate, are hereinafter called resistance tubes.

The requirement that the dynamic pressure drop at the ends of the tube should be negligible may be difficult to fulfill if high flow rates are required, as it means that the tube has to be very long. In these cases, it is advantageous to make the connections for the measurement of the pressure drop through holes in the resistance tube at some distance from the ends and sharp bends of the tube. In this way, the non-linear pressure drop at the inlets and outlets does not influence the measured pressure drop.

The volumetric flow rate in a resistance tube depends on the pressure drop, on the dimensions of the tube, and on the viscosity of the gas. For a specific gas it is possible to indicate a resistance figure pertinent to a resistance tube which means that the pressure drop across the tube divided by the resistance figure gives the flow rate.

In one class of apparatus according to the invention, the flow rates through the resistance tubes are adjustable so that it is possible to produce gas mixtures with a variable composition which can be calculated when the pressure drops are measured. It is possible to calibrate the manometers by which the pressure drops are measured in such a way that the readings directly indicate how many parts of the individual gas are contained in the mixture.

In another class of apparatus according to the invention, the same pressure drop exists over all the resistance tubes. These constructions will therefore deliver gases with a fixed composition ratio independently of the magnitude of the pressure drop. As it is possible to adjust very accurately to identical pressure drops over the resistance tubes by automatic means or by means of sensitive zero differential pressure indicators, these constructions can deliver gas mixtures with an extremely constant composition ratio.

The viscosity of gases depends rather heavily on the temperature, but the difference in temperature coefficient for the various gases is small. According to the invention, an improved accuracy is obtained when the resistance tubes are maintained at the same temperature. The composition ratio is then only influenced by the difference between the temperature coefficient of the viscosities. A further improvement of the accuracy can be obtained by thermostating of the resistance tubes.

An illustration of a suitable resistance tube is shown in FIGURE 6. The resistance tube 101 has been wound on a cylinder 28 supported by a mounting plate 29 with holes 30 for mounting. The two ends of the tube 101 have been inserted in a filter chamber 31 on the one side of the dust filter discs 32. On the other side of the filter disc, a connecting branch 33 for the gas and another connecting branch 34 for a manometer are connected to each filter chamber. The filter discs must have a negligible flow resistance compared to that of the resistance tube. The discs serve to protect the latter against impurities, particularly during assembling of the apparatus, as only dust free gases are supposed to be used for operation with the apparatus. When this is not the case, further filters must be inserted at another place in the system. The resistance tube shown can easily be stacked with bolts through the holes 30 and the complete package can be placed with the two spirals immersed in a constant temperature bath.

FIGURE 7 shows a resistance tube of a type in which the manometers are connected at a short distance from the ends of the tube. A mounting plate 129 carries the resistance tube 102 and the connecting branches 133 for the gases in addition to connecting branches 134 for the manometer. In the connecting branches, the dust filters 132 which in this case need not have a particularly low flow resistance have been built in. The mounting plate can carry more resistance tubes which can all be immersed in a container 119 with water to equalize temperature differences.

FIGURE 1 shows a schematic drawing of a system for producing a mixture of two gases in adjustable and known proportions. One gas is supplied through a tube 5 and an adjustable pressure regulator 11 to a resistance tube 1 for which the resistance figure is known for the particular gas. Across the resistance tube 1 the differential manometer 8 is connected. The other gas is supplied through a tube 6 and a pressure regulator 12 to a resistance tube 2. The resistance figure of this tube for this other gas is also known. Across the resistance tube, the differential manometer 9 is connected. The two gas streams are brought together to an outlet tube 14. The volumetric flow rate for each of the gases can be calculated as the pressure drop across the corresponding resistance tube divided by the resistance figure for the resistance tube for the particular gas. For the gas mixture which is supplied through the tube 14, it is thus possible to calculate the volume percentage for each of the gases. It is further possible to calibrate the two differential manometers 8 and 9 in such a manner that the composition ratio is read directly on the scales.

In the system shown in FIGURE 1, the mixing ratio changes when the back pressure from the flow through tube 14 changes, unless the two pressure regulators 11 and 12 are adjusted to the same pressure. In case there is a resistance to the gas flowing out through the tube 14, adjustment of e.g. the pressure regulator 11 not only changes the reading on the differential pressure meter 8, but also to a certain degree on 9. This interaction represents a certain inconvenience since adjustments to provide fixed desired composition ratios may often be necessary.

By inserting flow resistors with a large pressure drop in series with the resistance tubes so that the flow rates become independent of the back pressure, the disadvantages of a system as shown in FIGURE 1 can be avoided. Such flow resistors, hereinafter called pre-resistors, must have a flow resistance which is large compared to the flow resistance against which the gas flowing out works to make the interaction between the pressure indicators negligible. The precise resistance of these elements need not be known, however, and their resistance does not have to be linear nor need it have any considerable long term stability. Narrow tubes can be used as pre-resistors and also porous material, such as sintered elements, so that a suitable flow resistance is obtained. It is advantageous to combine the pre-resistors with dust filters at the input end.

The pre-resistors provide an additional advantage since the adjusted flow rate will be maintained at a more constant value independently of variations in the pressure delivered by the pressure regulators. If the absolute variation in the pressure is independent of the pressure delivered, as is most often the case in an ordinary reduction valve, then a pre-resistor of such a value that the pressure delivered by the pressure regulator is 10 times the pressure across the resistance tube will reduce the variation in the flow rate produced by the uncertainty of the pressure by a factor of 10.

As an example of how the pre-resistors are used, FIGURE 2 shows schematically an apparatus for production of a mixture of three gases in adjustable and known ratios. The three gases are supplied through the tubes 55, 56 and 57. The pressures are adjusted by means of the pressure regulators 111, 112, and 113, after which the gases are fed to the resistance tubes 121, 122 and 123 through the preresistors 116, 117 and 118, which are shown schematically corresponding to the showing in FIGURE 7. At the output of the resistance tubes, the gases are brought together in the outlet tube 114. Across the resistance tubes, the differential pressure meters 108, 109 and 110 are connected. The pressure differences read on these, divided by the resistance figures for the resistance tubes, give the flow rate for the three gases and accordingly the composition of the gas mixture. The resistance tubes are placed in a common vessel 190, containing water or another liquid to maintain the resistance tubes at the same temperature. Temperature differences can be reduced by stirring of the liquid.

FIGURE 3 shows schematically an apparatus for mixing of two gases in a fixed known proportion. The pressure regulators 211 and 212 are adjusted in such a way that a zero differential pressure indicator 220 shows that there is no pressure difference between the two input ends of the resistance tubes. As the resistance tubes have the same pressure at the output end where they are connected, the flow rate through the tubes will be inversely proportional to the resistance figure for the resistance tubes for the particular gases, and the composition ratio will be constant independently of the common pressure drop or expressed in a different way, independent of the total flow rate for the gas mixture.

FIGURE 4 shows schematically an apparatus for simultaneous production of two gases in two different fixed and known ratios. The apparatus contains two sets of resistance tubes 401, 402, and 403, 404. The principle is as indicated for the apparatus shown in FIGURE 3, i.e., the pressure of the input end of the resistance tubes is maintained at the same value. As the pressure at the output end is identical for each set of resistance tubes, each set will deliver a constant mixture. FIGURE 4 further shows some improvements over FIGURE 3, such as insertion of a resistance tube 416 by which as previously mentioned, the flow rate is more easily maintained at a constant value. Furthermore, an automatic differential pressure regulator 421 is used. The differential pressure regulator is controlled by the pressure at the input end of the resistance tubes 401 and 403, which are supplied to the regulator through the tube 422. The regulator can be adjusted to differential pressure zero by watching the indicator 420. After the adjustment, the regulator will automatically maintain the differential pressure of zero under varying conditions of use. To improve the accuracy of the composition ratios, the resistance tubes have been placed in a vessel 419 to minimize temperature differences or for thermostatting purposes. The mixed gases are collected at points 414 and 415.

FIGURE 5 shows a design of a very sensitive differential pressure regulator which can be used e.g. in connection with the apparatus shown in FIGURE 4. The control pressure is supplied to the regulator through the tube 422 and acts on the one side of an easily movable flexible membrane 423. The gas for which the pressure is to be controlled with respect to the pressure in the tube 422 is supplied through a capillary tube 424 to the other side of the membrane 423. A pressure regulator 425 maintains a flow through the capillary tube which is larger than the flow of the corresponding gas through the resistance tubes connected to the tube 424. The surplus gas is blown out through a nozzle 427, the distance of which from the membrane can be adjusted. If the pressure on the nozzle side of the membrane becomes larger than the control pressure on the other side, the distance of the membrane from the nozzle is increased and a larger volume of the gas is blown out through the nozzle. With an easily movable membrane, it is possible to maintain a pressure difference of zero within very narrow limits when the nozzle once has been adjusted in a suitable manner.

A pressure regulator as described above must, according to its principle of operation, waste part of the gas. This is in certain cases no limitation. For one thing, the particular gas can be present in an unlimited quantity, as e.g. atmospheric air, or the volume percentages desired for the particular gas can be so small that a certain waste is of no consequence when the larger consumption of the other gases is taken into consideration.

The apparatus described in FIGURES 2 and 4 can be varied in many ways. It is quite evident that FIGURE 4 can be extended with more sets of resistance tubes so that more than two gas mixtures with fixed composition ratios can be produced. Furthermore, the apparatus can be designed to mix three or more—say $n$—gases in a number—say $m$—of fixed mixing ratios. This will require $n-1$ differential pressure regulators and $m$ sets of resistance tubes each set containing a resistance tube for each gas contained in the mixture.

An important variation is used to mix atmospheric air with carbon dioxide in one or more fixed ratios. In this case, it is advantageous to use an apparatus analogous to FIGURE 4 with a differential pressure regulator according to the principle indicated in FIGURE 5. The carbon dioxide is used to control the pressure of the atmospheric air by blowing the surplus volume out through the nozzle 427. In this case, the pressure regulator 425 is not used, the regulator being replaced by a centrifugal blower driven by a synchronous or asynchronous motor. Such a blower will itself maintain a sufficiently constant input pressure to the capillary tube.

As the atmospheric air contains water vapor and carbon dioxide in variable quantities, it is necessary to remove these impurities by using filters which can either be inserted in front of or after the differential pressure regulator. With regard to the filter capacity, it will be appropriate to insert the filters after the regulator but in front of the zero differential pressure indicator. The flow resistance of the filters should be negligible in relation to that of the resistance tubes. Furthermore, the apparatus working with atmospheric air should contain a dust filter which preferably should be inserted in front of the zero differential pressure regulator.

That which is claimed is:

1. An apparatus for use in the continuous mixing of at least two gases whereby mixtures of said gases can be obtained in adjustable proportions, said apparatus comprising a resistance tube for each of said gases, said resistance tubes being dimensioned whereby the pressure drop across each tube is proportional to the flow rate in the tube, a manometer connected across each of said resistance tubes for measuring said pressure drops, a common outlet connected to the outlet ends of each resistance tube for receiving gases from the resistance tubes, and pre-resistor means for feeding gas to said resistance tubes from gas sources of adjustable pressure, said pre-resistor mean having a flow resistance to the gases passing therethrough which exceeds the flow resistance of said resistance tubes.

2. An apparatus according to claim 1 wherein the manometers are calibrated directly in units proportional to the flow rate of the particular gases.

3. An apparatus according to claim 1 wherein the manometers are connected to said resistance tubes in such a manner that the non-linear conditions existing at the input and output ends of the tubes do not influence the measurement.

4. An apparatus according to claim 1 including means associated with said resistance tubes adapted to minimize temperature differences between the tubes.

5. An apparatus for use in the continuous mixing of at least two gases in at least one fixed mixing ratio, comprising a main line for each of said gases, a set of resistance tubes for each mixing ratio, said resistance tubes being dimensioned whereby the pressure drop across each tube is proportional to the flow rate in the tube, the upstream ends of the resistance tubes in each set being connected to the main lines conducting the gas components present in said mixture, and the downstream ends of the resistance tubes being connected to a common outlet tube for the gas mixture characterized by said ratio, pre-resistor means for feeding gas to one main line from a gas source of approximately constant pressure, said pre-resistor means having a higher flow resistance than the resistance tubes connected to said one main line, and differential pressure regulator means for regulating the pressure on said additional main lines to the same value as the pressure on said first mentioned main line.

6. An apparatus according to claim 5 wherein said differential pressure regulator means include a flexible membrane movable in response to the influence of the pressure difference between the gases, an exhaust nozzle located adjacent said membrane, and a capillary tube through which gas is supplied at a relatively high pressure, the movement of said membranes thereby operating to vary the gas discharged through the exhaust nozzle whereby the pressure on the nozzle side of the membrane is maintained substantially the same as the pressure on the other side.

7. An apparatus according to claim 5 including means associated with said resistance tubes adapted to minimize temperature differences between the tubes.

8. An apparatus for use in the continuous mixing of at least two gases in at least one fixed mixing ratio, comprising a main line for each of said gases, pressure regulating means for maintaining said main lines at equal pressures, at least one resistance tube connected to each main line, said resistance tubes being dimensioned whereby the pressure drop across each tube is proportional to the flow rate in the tube, said resistance tubes conducting the respective gases to a common outlet tube for the gas mixture characterized by said ratio, and wherein at least some of the main lines have a plurality of resistance tubes connected thereto, and a plurality of outlet tubes each connected to resistance tubes associated with at least two different main lines.

9. An apparatus for use in the continuous mixing of at least two gases in at least one fixed mixing ratio, comprising a main line for each of said gases, pressure regulating means for maintaining said main lines at equal pressures, at least one resistance tube connected to each main line, said resistance tubes being dimensioned whereby the pressure drop across each tube is proportional to the flow rate in the tube, said resistance tubes conducting the respective gases to a common outlet tube for the gas mixture characterized by said ratio, and wherein at least one of the main lines has a plurality of resistance tubes connected thereto, and a plurality of outlet tubes each connected to resistance tubes associated with at least two different main lines.

References Cited

UNITED STATES PATENTS

| | | | |
|---|---|---|---|
| 1,954,261 | 4/1934 | Pierce | 137—340 X |
| 2,012,361 | 8/1935 | Thomas et al. | 137—340 X |
| 1,452,265 | 4/1923 | Collins et al. | 137—7 |
| 1,713,833 | 5/1929 | Kochendorfer | 137—486 |
| 1,783,163 | 11/1930 | Griswold | 137—605 X |
| 2,528,422 | 10/1950 | Chace | 137—606 X |
| 2,707,964 | 5/1955 | Monroe | 137—7 X |
| 2,837,102 | 6/1958 | Bauer et al. | 137—7 |
| 2,899,969 | 8/1959 | Kirby | 137—12 X |
| 3,221,757 | 12/1965 | Newton | 137—604 X |
| 3,276,460 | 10/1966 | Feld | 137—7 X |
| 3,343,559 | 9/1967 | Goplen et al. | 137—510 X |

WILLIAM F. O'DEA, Primary Examiner

ROBERT G. NILSON, Assistant Examiner

U.S. Cl. X.R.

137—7, 340, 606